(12) United States Patent
Sherwani et al.

(10) Patent No.: US 12,011,664 B2
(45) Date of Patent: *Jun. 18, 2024

(54) SPOILER BLOCK SERVICE

(71) Applicant: Sony Interactive Entertainment LLC, San Mateo, CA (US)

(72) Inventors: Adil Sherwani, Oakland, CA (US); Warren Benedetto, Foothill Ranch, CA (US); Landon Noss, Laguna Niguel, CA (US); Benedikt Neuenfeldt, Tokyo (JP); Yohei Nishikawa, Tokyo (JP)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,886

(22) Filed: May 2, 2022

(65) Prior Publication Data

US 2022/0249956 A1    Aug. 11, 2022

Related U.S. Application Data

(63) Continuation of application No. 16/657,178, filed on Oct. 18, 2019, now Pat. No. 11,318,388.

(60) Provisional application No. 62/749,592, filed on Oct. 23, 2018.

(51) Int. Cl.
*A63F 13/30* (2014.01)
*A63F 13/69* (2014.01)
*G06F 16/9536* (2019.01)

(52) U.S. Cl.
CPC .............. *A63F 13/69* (2014.09); *A63F 13/30* (2014.09); *G06F 16/9536* (2019.01); *A63F 2300/53* (2013.01); *A63F 2300/609* (2013.01)

(58) Field of Classification Search
CPC ................................. A63F 13/30; A63F 13/69
See application file for complete search history.

(56) References Cited

U.S. PATENT DOCUMENTS

| 9,449,526 B1 | 9/2016 | Tseng et al. |
| 2010/0119215 A1 | 5/2010 | Chien et al. |
| 2012/0072941 A1 | 3/2012 | Thornberry et al. |
| 2013/0227086 A1 | 8/2013 | Stout |
| 2013/0325954 A1 | 12/2013 | Cupala et al. |
| 2014/0101244 A1 | 4/2014 | Klein et al. |

(Continued)

FOREIGN PATENT DOCUMENTS

| JP | 2002224452 A | 8/2002 |
| JP | 2007267173 A | 11/2007 |

(Continued)

*Primary Examiner* — Jay Trent Liddle
(74) *Attorney, Agent, or Firm* — Carr & Ferrell LLP

(57) ABSTRACT

Computer implemented systems and methods for cross-platform spoiler blocking are provided herein. An example method includes ascertaining by a data platform data potentially available to a user of a service having a media object; identifying by the data platform at least one object revealed by the media object, the at least one object being associated with an application; receiving by the data platform metadata associated with the at least one object, the metadata indicative of whether the at least one object should be hidden from the user; determining by the data platform, based on the metadata, the at least one object is a potential spoiler; and blocking by the data platform, the user from interacting with the media object through the service.

15 Claims, 6 Drawing Sheets

(56) References Cited

U.S. PATENT DOCUMENTS

| | | |
|---|---|---|
| 2014/0181197 A1 | 6/2014 | Baggott |
| 2014/0214980 A1 | 7/2014 | Jung |
| 2014/0297260 A1 | 10/2014 | Allen |
| 2014/0349749 A1 | 11/2014 | Nogami et al. |
| 2015/0005065 A1 | 1/2015 | Mizuki et al. |
| 2015/0007014 A1 | 1/2015 | Allen |
| 2016/0149956 A1 | 5/2016 | Bimbaum et al. |
| 2016/0191999 A1 | 6/2016 | Friedrich |
| 2017/0136367 A1 | 5/2017 | Watari et al. |
| 2018/0152758 A1 | 5/2018 | Miller |
| 2018/0152759 A1 | 5/2018 | Miller |
| 2018/0373689 A1 | 12/2018 | Haynes et al. |
| 2019/0253757 A1 | 8/2019 | Leister |
| 2019/0291010 A1 | 9/2019 | Benedetto et al. |
| 2020/0122041 A1 | 4/2020 | Sherwani et al. |

FOREIGN PATENT DOCUMENTS

| | | |
|---|---|---|
| JP | 2015162174 A | 9/2015 |
| JP | 2016521387 A | 7/2016 |
| WO | WO2017121768 A1 | 7/2017 |

SPOILER BLOCK SERVICE

CROSS REFERENCE TO RELATED APPLICATION

This application is a Continuation of U.S. patent application Ser. No. 16/657,178, filed on Oct. 18, 2019, which claims the benefit of U.S. Provisional Application No. 62/749,592, filed on Oct. 23, 2018.

FIELD

The present technology relates generally to remote networked game services, and more particularly to systems and methods for blocking potential spoilers for users playing video games associated with a data platform.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

A spoiler is a description of an important plot development in a video game which, if previously known, may reduce surprise or suspense for a first-time player. Exposure to spoilers can decrease the quality of the overall gaming experience for a player, and can even make the player lose interest in playing the game. Avoiding spoilers is of paramount importance to players of narrative-driven games. Spoilers can prevent such players from deeply engaging in the gaming community until those players have completed the game, limiting their engagement level with that community.

Moreover, spoilers are one of the biggest concerns for players of single-player and co-op player vs. environment (PvE) style games when engaging socially around those games with their friends or the broader gaming community (e.g., through discussions, walkthroughs, and so forth). This fear can prevent players from engaging in community-building social behaviors, which may result in a significant loss of engagement with the gaming platform for those users.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one example embodiment of the present disclosure, a computer-implemented system computer-implemented system for cross-platform for cross-platform spoiler blocking is provided. The system can comprise a data platform configured to ascertain data potentially available to a user of a service having a media object, identify at least one object revealed by the media object, receive metadata associated with the at least one object, the metadata indicative of whether the at least one object should be hidden from the user, determine the at least one object is a potential spoiler, and block the user from interacting with the at least one least object marked as hidden through the at least one application. The system can also include a data base configured to store the metadata.

The data platform can be further configured to determine that the at least one object has been discovered by the user, and based on the determination, remove, by the data platform, the hidden marking from the metadata associated with the at least one object. The at least one object can include lore, a trophy, user generated content, an activity, a character, a weapon, an entity, a setting, an outcome, an action, an effect, a location, a video, a community thread, a level, an item, a character, and character statistics. Blocking the at least one potential object can include preventing the user from engaging with the at least one object. The blocking can also include removing information related to the at least one object from a user interface.

The data platform can be further configured to receive, from the user, a request to remove a hidden marking from the metadata associated with the at least one object, and in response to the request, mark objects associated with the at least one type of object as visible for the user.

According to another example embodiment of the disclosure, a computer-implemented method for cross-platform spoiler blocking is provided. The method can comprise ascertaining, by a data platform, data potentially available to a user a service having a media object; identify at least one object revealed by the media object; receive metadata associated with the at least one object, the metadata indicative of whether the at least one object should be hidden from the user; determining, by the data platform based on the metadata, the at least one object is a potential spoiler; and blocking the user from interacting with the media object through the service.

The method for cross-platform spoiler blocking can further comprise determining that the at least one object has been discovered by the user; and based on the determination, removing the hidden marking from the metadata associated with the at least one object.

The at least one object can include lore, a trophy, user generated content, an activity, a character, a weapon, an entity, a setting, an outcome, an action, an effect, a location, a video, a community thread, a level, an item, a character, and character statistics. The blocking can include preventing the user from engaging with the at least one object. The blocking can also include removing information related to the at least one object from a user interface.

The method for cross-platform spoiler blocking can also include receiving, from the user, a request to remove a hidden marking from the metadata associated with at least one type of object and in response to the request, marking objects associated with the at least one type of object as visible for the user.

According to another example embodiment of the present disclosure, the steps of the method for cross-platform spoiler blocking is stored on a non-transitory machine-readable medium comprising instructions, which when implemented by one or more processors perform the recited steps.

Other example embodiments of the disclosure and aspects will become apparent from the following description taken in conjunction with the following drawings.

BRIEF DESCRIPTION OF THE DRAWINGS

Embodiments are illustrated by way of example, and not by limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

The technology disclosed herein is directed to recognizing which in-game objects (e.g., activities, characters, weapons, and so forth) have been seen in-game by each player, and thus prevent that player from engaging with content (e.g., user generated content (UGC), trophies, lore objects, and so forth) that they would prefer to discover in the game as a matter of course.

The usage pattern can be similar to that of "hidden trophies" in Sony PlayStation 4. Game developers can mark specific game objects as 'hidden' via an appropriate tool, and the details of those objects will be hidden from players until they discover them in the game themselves. As with hidden trophies, players will have the option to override the spoiler block if they so choose. The technology disclosed herein can allow players to engage with friends and the community around narrative games with the confidence that they will not accidentally see spoilers (which can include an activity, character, item, outcome of activity, action, effect, location, and attribute of character or item).

A uniform data system (UDS) can be aware of what in-game entities and activities users have engaged with, and thus support players in avoiding unwanted spoilers, giving them confidence to engage with the community without fear. The general solution pattern is that any object type can be considered a spoiler, and as such, can be marked as 'hidden' by the developer in the metadata for that object type. When that object type is discovered by the player (e.g., an example of a UDS event), it is no longer treated as a spoiler for that player. This pattern can be applied to activities, entities, settings, outcomes, actions, effects, locations and character stats. This approach can result in an increase in the number of single-player and co-op PvE gamers who engage socially around those games, with their friends, and the broader community.

Figure 1:
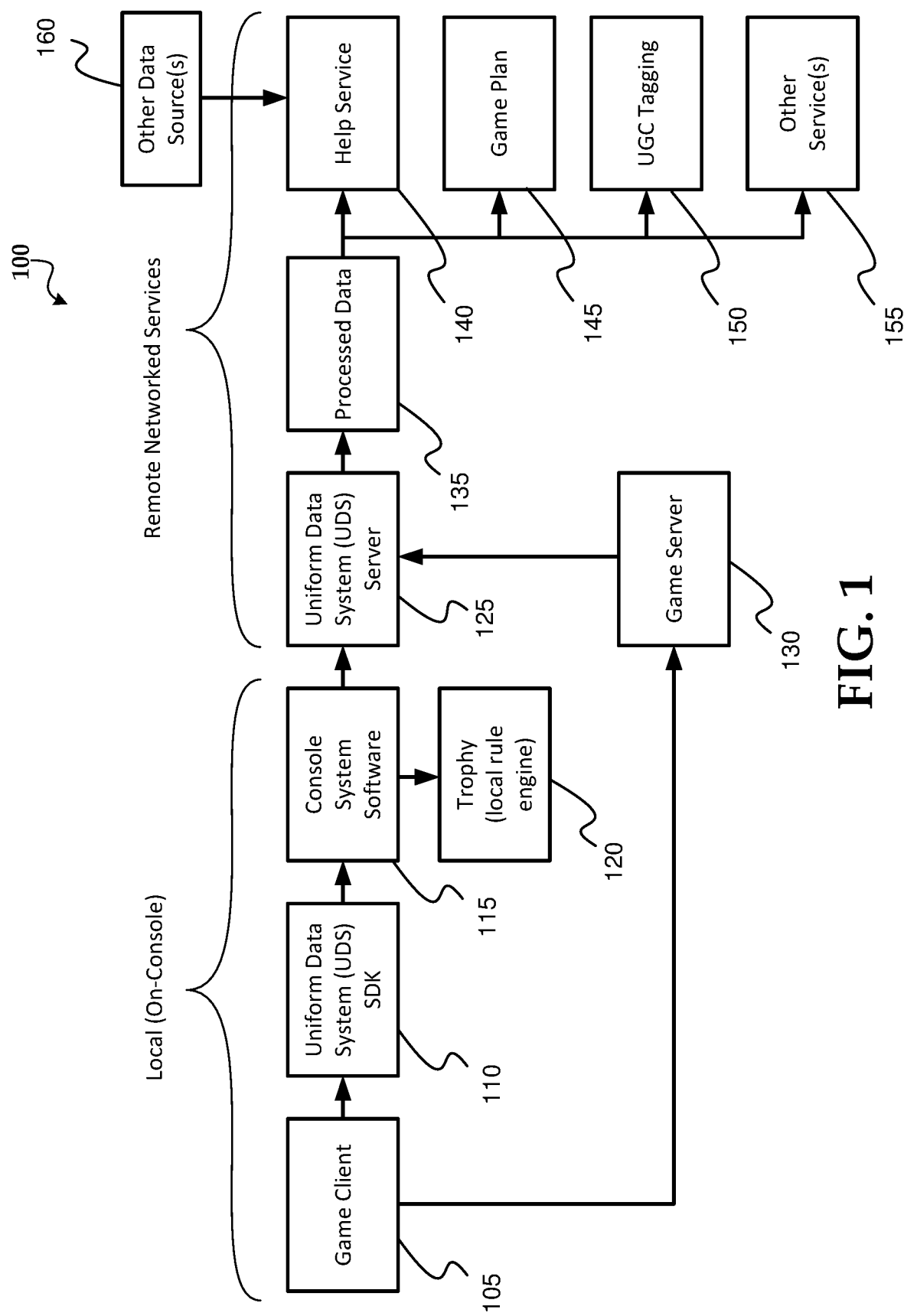
FIG. 1 shows an exemplary system architecture for providing users with contextual information regarding available game activities, according to one example embodiment.

FIG. 1 is an exemplary system architecture 100 for providing users with contextual information regarding available game activities, according to one example embodiment. In some embodiments, the exemplary system architecture 100 includes a game client 105, a uniform data system (UDS) software development kit (SDK) 110, console system software 115, a local rule engine 120, a UDS server 125, a game server 130, processed data 135, and one or more other remote networked services, including a help service 140, game plan 145, user generated content (UGC) tagging 150, and other service(s) 155. The help service 140 may also receive information from other data source(s) 160.

The game client 105 and game server 130 provide contextual information regarding a plurality of applications to a uniform data system (UDS) server 125 via a UDS data model describing the logical structure of UDS data used by the UDS SDK 110. The UDS data model enables the platform to realize remote networked services, such as the help service 140, game plan 145, UGC tagging 150, and other service(s) 155 that require game data, without requiring each game to be patched separately to support each service. The UDS data model assigns contextual information to each portion of information in a unified way across games. The contextual information from the game client 105 and UDS SDK 110 is provided to the UDS server 125 via the console system software 115. It is to be understood that the game client 105, UDS SDK 110, console system software 115, and local rule engine 120 may run on a computer or other suitable hardware for executing a plurality of applications.

The UDS server 125 receives and stores contextual information from the game client 105 and game server 130 from a plurality of applications. To be sure, the UDS server 125 may receive contextual information from a plurality of game clients and game servers for multiple users. The information may be uniformly processed 135 and then received by the plurality of remote networked services 140, 145, 150, and 155.

Figure 2:
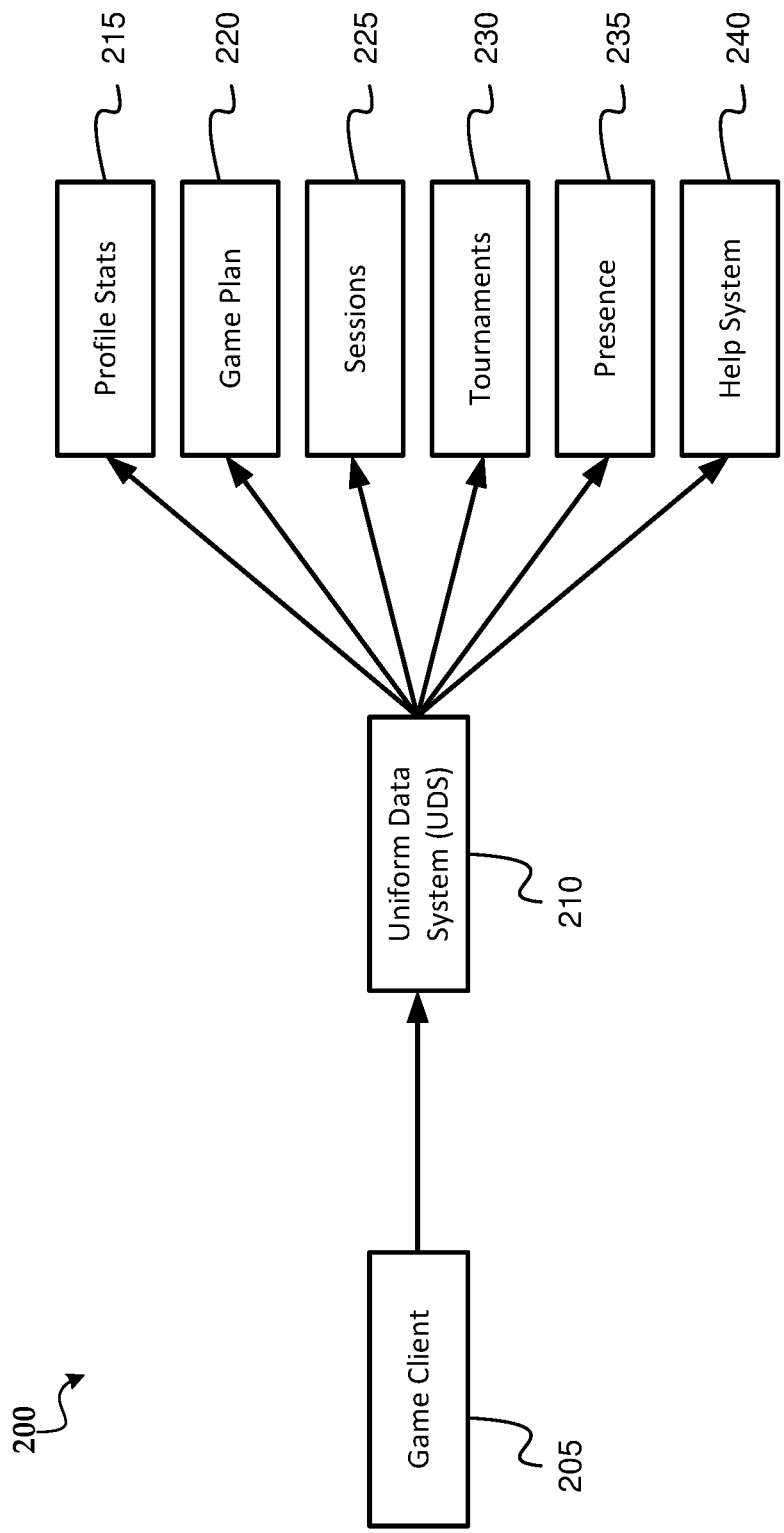
FIG. 2 illustrates another exemplary system architecture, according to one example embodiment.

FIG. 2 shows another exemplary embodiment of a system architecture according to the present disclosure. A game client 205 sends contextual information to a UDS server 210, which provides the contextual information in a unified data model to a plurality of remote networked services, including profile stats 215, game plan 220, sessions 225, tournaments 230, presence 235, and help system 240.

Figure 3:
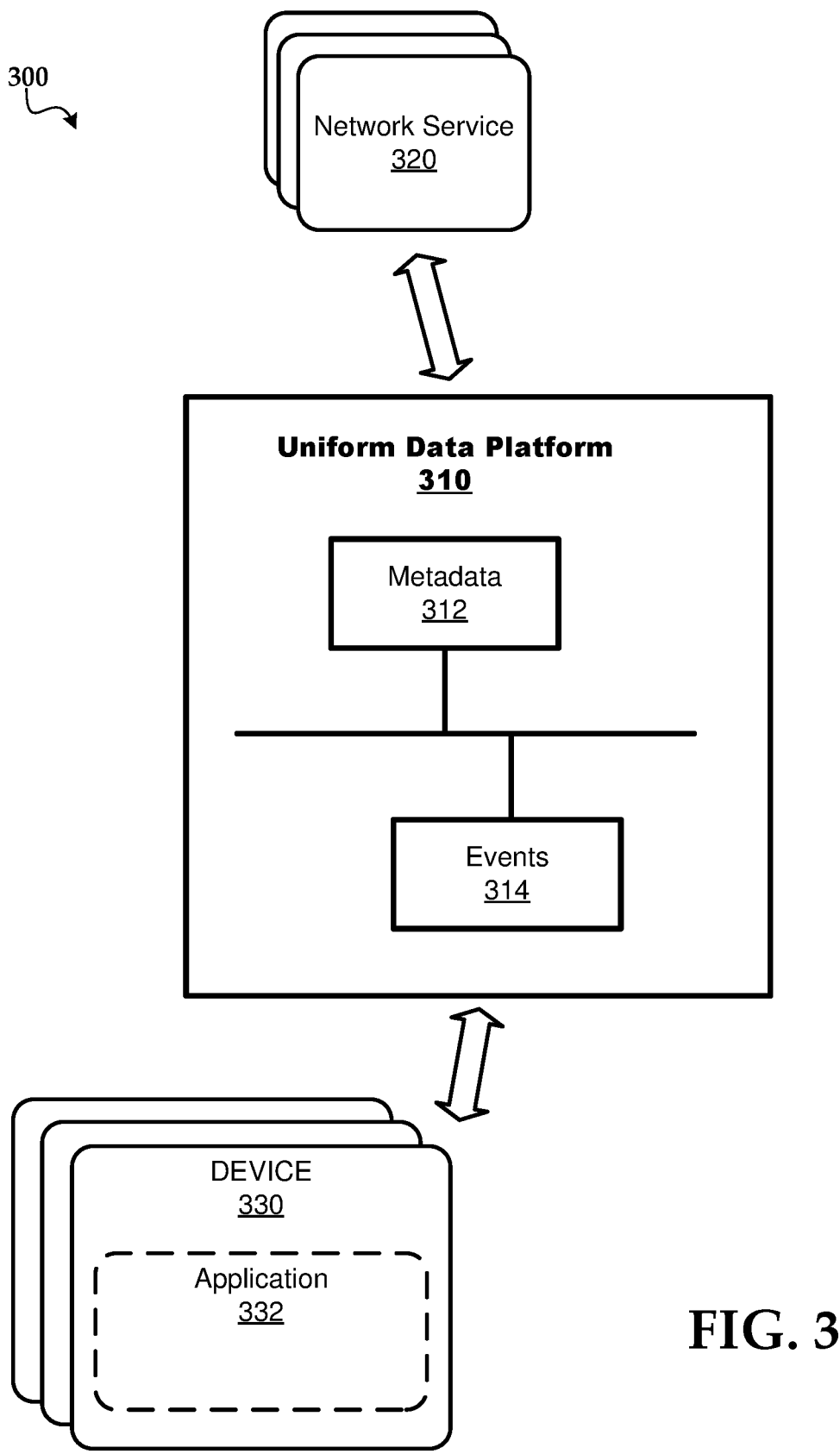
FIG. 3 shows an exemplary system for providing a data model for a uniform data platform, according to one example embodiment.

FIG. 3 illustrates an exemplary system 300 for providing data model for a uniform data platform 310, according to an example embodiment of the disclosure. In one example embodiment, system 300 can include at least one device 330 configured to execute at least one of a plurality of applications 332, each application having an application data structure. A uniform data platform 310 can be executed on one or more servers. The uniform data platform 310 can include a data model which is uniform across the plurality of application data structures. The data model can include metadata 312 corresponding to at least one object indicated in the data model, and events 314 corresponding to a trigger condition associated with at least one metadata entry. The values of the metadata 312 and events 314 can be associated with a user profile. The uniform data platform 310 can be configured to receive application data from the at least one device 330 and store the application data within the data model. The system 300 can also include a plurality of remote networked services 320 configured to access the application data from the uniform data platform 310 using the data model.

In various embodiments, the metadata 312 may include: a list of all activities that a user can do in an application, an activity name, a description of the activity, a state of the activity (whether available, started, or completed), whether the activity is required to complete an objective or campaign, a completion reward for the activity, an intro or outro cutscene, an in-game location, one or more conditions that must be met before the activity becomes available, and a parent activity that contains the activity as a sub-activity. Metadata 312 may further include: a list of abilities exercisable by the user, effects of each action, telemetry indicative of when actions and effects take place including corresponding timestamps and locations, an in-game coordinate system, a list of in-game branch situations, and telemetry indicative of when a branch situation is encountered and which option is selected by the user. A list of in-game statistics, items, lore, in-game zones and corresponding attributes regarding each statistic, item, lore, or zone may likewise be included in the metadata 312. In addition, the metadata 312 may indicate whether or not a particular activity, entity (such as a character, item, ability, etc.), setting, outcome, action, effect, location, or attribute should be marked as hidden.

Events 314 may be fired in response to several various trigger conditions. For example, such trigger conditions may include: an activity that was previously unavailable becomes available, a user starts an activity, a user ends an activity, an opening or ending cutscene for an activity begins or ends, the user's in-game location or zone changes, an in-game statistic changes, an item or lore is acquired, an action is performed, an effect occurs, the user interacts with a character, item, or other in-game entity, and an activity, entity, setting, outcome, action, effect, location, or attribute is discovered. The events 314 may include further information regarding a state of the application when the events 314 were triggered, for example a timestamp, a difficulty setting and character statistics at the time a user starts or ends an activity, success or failure of an activity, or a score or duration of time associated with a completed activity.

Figure 4:
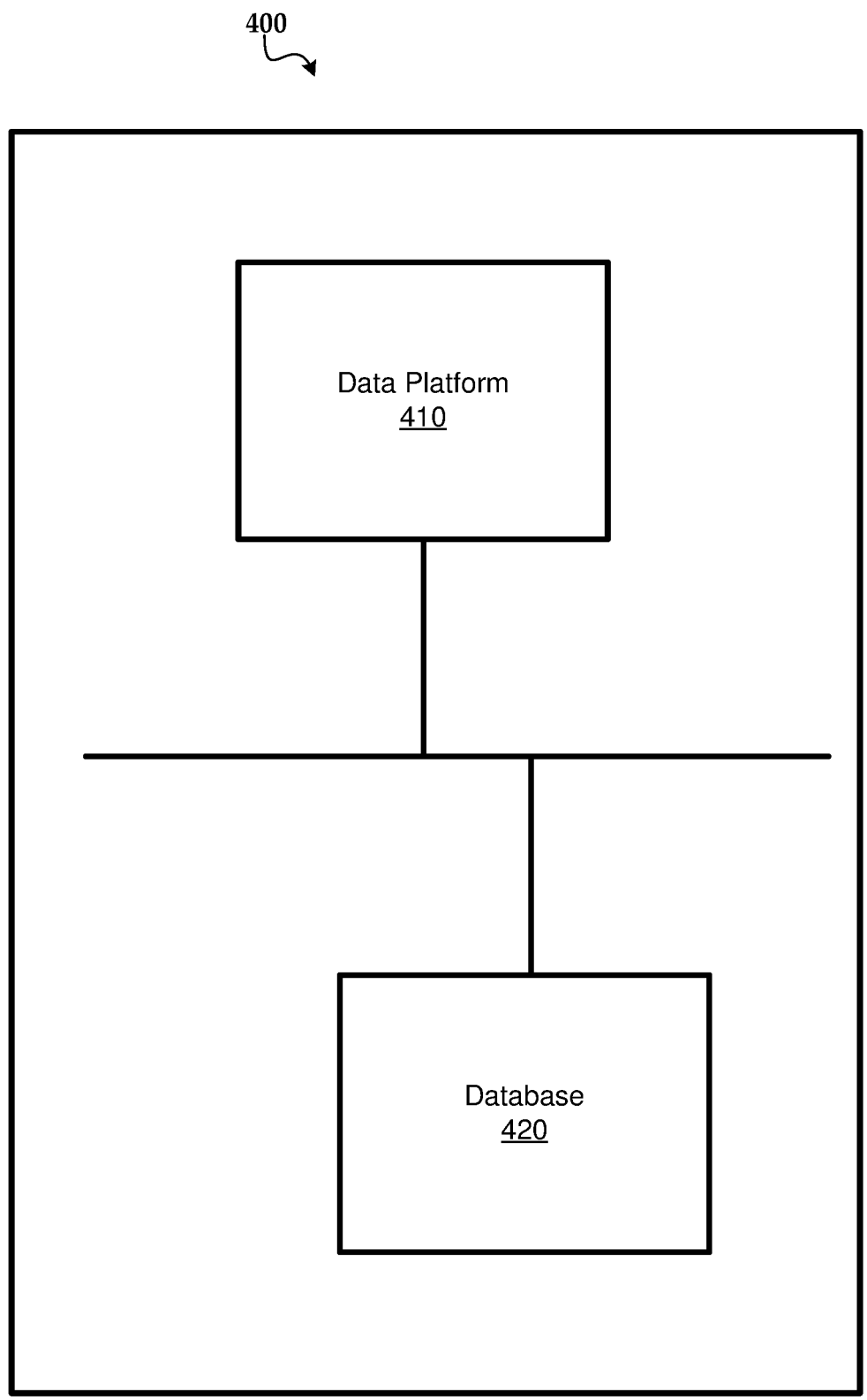
FIG. 4 shows an exemplary system for cross-platform spoiler blocking, according to one example embodiment.

FIG. 4 illustrates an exemplary cross-platform spoiler block system 400, according to an example embodiment of the disclosure. In one example embodiment, system 400 can include a data platform 410 and a database 420.

Data platform 410 can be configured to ascertain data potentially available to a user of at least one service associated with the data platform, determine at least one media object associated with the data as having a potential spoiler, and based on the determination, block the user from interacting with the at least one media object through the at least one service. For example, the at least one service may include a video-sharing service, a forum, a messaging service, or other suitable source of content that may include potential spoilers for the user. In various embodiments, the at least one media object includes text, an image, a video, a broadcast, or other suitable media. Likewise, the at least one media object may include an icon or thumbnail of a video or broadcast, or any text or images within the video or broadcast.

To determine that the at least one media object associated with the data includes a potential spoiler, the data platform 410 may be configured to identify one or more UDS objects revealed by or otherwise presented inside the media object. The data platform 410 may use natural language processing, image recognition, speech recognition, or other suitable methods known in the art to identify the one or more UDS objects. The data platform may further identify time-ranges within a video or broadcast associated with each of the one or more UDS objects. It is to be understood that each UDS object may be associated with an application, such as a game, and representative of an in-game object such as an activity, entity, setting, outcome, action, effect, location, attribute, lore, trophy, item, or statistic that may have or have not been discovered yet by the user.

The data platform 410 may be further configured to receive metadata associated with the one or more UDS objects from a UDS server, the metadata indicative of whether the object should be hidden for this particular user. Alternatively, the metadata may be retrieved from the database 420. It is to be understood that the UDS server may comprise metadata for each UDS object for a plurality of user profiles. Thus, the data platform 410 can distinguish between what may potentially spoil different users based on metadata associated with that user. In one or more embodiments, the data platform 410 sends a request for metadata to the UDS server and the UDS server responds with the corresponding metadata. The request may include an identifier for each of the one or more UDS objects and an identifier associated with the user or the user's profile.

The data platform 410, or alternatively the UDS server, can be further configured to determine that the at least one UDS object has been discovered by the user, and based on the determination, remove, by the data platform, the hidden marking from the metadata associated with the at least one UDS object. In certain embodiments, all UDS objects associated with a particular application may be initially marked as hidden, either automatically by the system or manually by a developer, and unmarked as hidden by user activity as the user discovers each UDS object over the course of using the application. In various embodiments, the UDS server may uncheck the hidden marking from the metadata associated with at least one UDS object based on one or more conditions that must be met before unchecking the hidden marking. For example, a certain UDS object may be considered as discovered only after the user has progressed passed a specific stage and met a particular character.

Blocking the at least one media object can include preventing the user from engaging with the at least one media object. The blocking can also include removing information related to the at least one UDS object from a user interface having the at least one media object. The information related to the at least one UDS object may be filtered out prior to displaying the user interface to the user. For example, spoiling text may be removed or replaced with a spoiler alert. In a further example, the time-ranges in a video associated with the object marked as hidden may be blurred, covered with a spoiler warning, or skipped over altogether. Additionally, the data platform 410 may cause a notification or alert to be displayed to the user, informing the user that a potential spoiler exists. The data platform 410 may also block the potential spoiler with an overlay or by making the spoiling media invisible, and indicate to the user that a potential spoiler exists but allow the user to remove the overlay or invisibility if desired.

For example, the user may be viewing a forum comprising a plurality of comments, each comment having unstructured data which may contain a potential spoiler for a game the user is playing either via text, image, video, etc. If the data platform 410 identifies a comment associated with a UDS object that the user has not discovered, such that the UDS object is associated with metadata marked as hidden, the data platform 410 may block or otherwise redact the potentially spoiling comment. The data platform 410 may block the specific media that was identified as comprising the spoiler, such as a particular sentence in the comment, or may alternatively block the entire comment. Advantageously, the system allows the user to view the forum and the nonspoiling information without accidentally viewing any potentially spoiling information.

The data platform can be further configured to receive, from the user, a request to remove hidden markings from the metadata associated with at least one type of the objects and in response to the request, remove the hidden markings from the metadata. Alternatively, the metadata may include a separate visible field indicating whether the user would like to see the information regardless of whether the metadata includes a hidden marking. In response to receiving, from the user, a request to remove hidden markings from the metadata associated with at least one type of the objects, the data platform 410 may instead check the visible field for each UDS object associated with that type of object. In addition, if the user indicates a preference to not check for spoilers, the data platform 410 may skip the identifying step altogether for efficiency. Database 420 can be associated with the data platform configured to store the metadata associated with the at least one object as hidden from the user.

As those of ordinary skill in the art would recognize, certain functions or features of the data platform 410 may be shared between the data platform 410 and the UDS server 125/210. Alternatively, the data platform and UDS server may reside on the same server or plurality of servers. Other suitable configurations are possible and are contemplated by the present disclosure.

Figure 5:
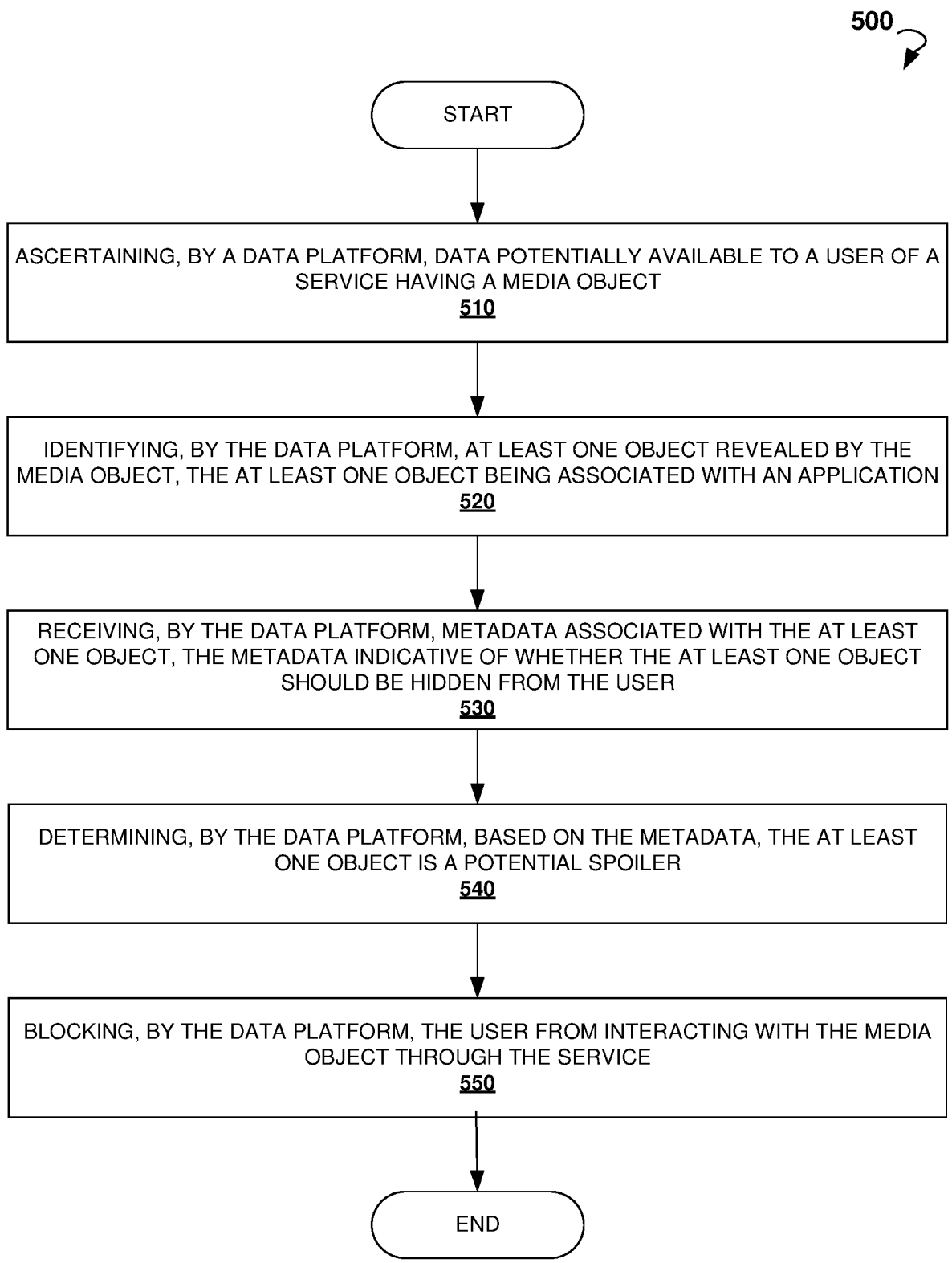
FIG. 5 illustrates a flow diagram of a method for cross-platform spoiler blocking, according to one example embodiment.

FIG. 5 is a process flow diagram showing a method 500 for cross-platform blocking of spoilers. Method 500 can be performed by processing logic that includes hardware (e.g., decision-making logic, dedicated logic, programmable logic, application-specific integrated circuit), software (such as software run on a general-purpose computer system or a dedicated machine), or a combination of both. In example embodiments, the processing logic refers to one or more elements of the system architecture 100 and 200 of FIGS. 1 and 2. Operations of method 500 recited below can be implemented in an order different than the order described and shown in the figure. Moreover, method 500 may have additional operations not shown herein, but which can be evident from the disclosure to those skilled in the art. Method 500 may also have fewer operations than shown in FIG. 5 and described below.

As shown in FIG. 5, a method for cross-platform spoiler blocking can commence in operation 510 with ascertaining data potentially available to a user of a service having a media object. In operation 520, method 500 can proceed with identifying at least one object revealed by the media object, the at least one object being associated with an application. In operation 530, method 500 may include receiving metadata associated with the at least one object, the metadata indicative of whether the at least one object should be hidden from the user. Based on the metadata, in operation 540, method 500 can determine that the at least one object is a potential spoiler. Finally, in operation 550, method 500 can block the user from interacting with the media object through the service.

Figure 6:
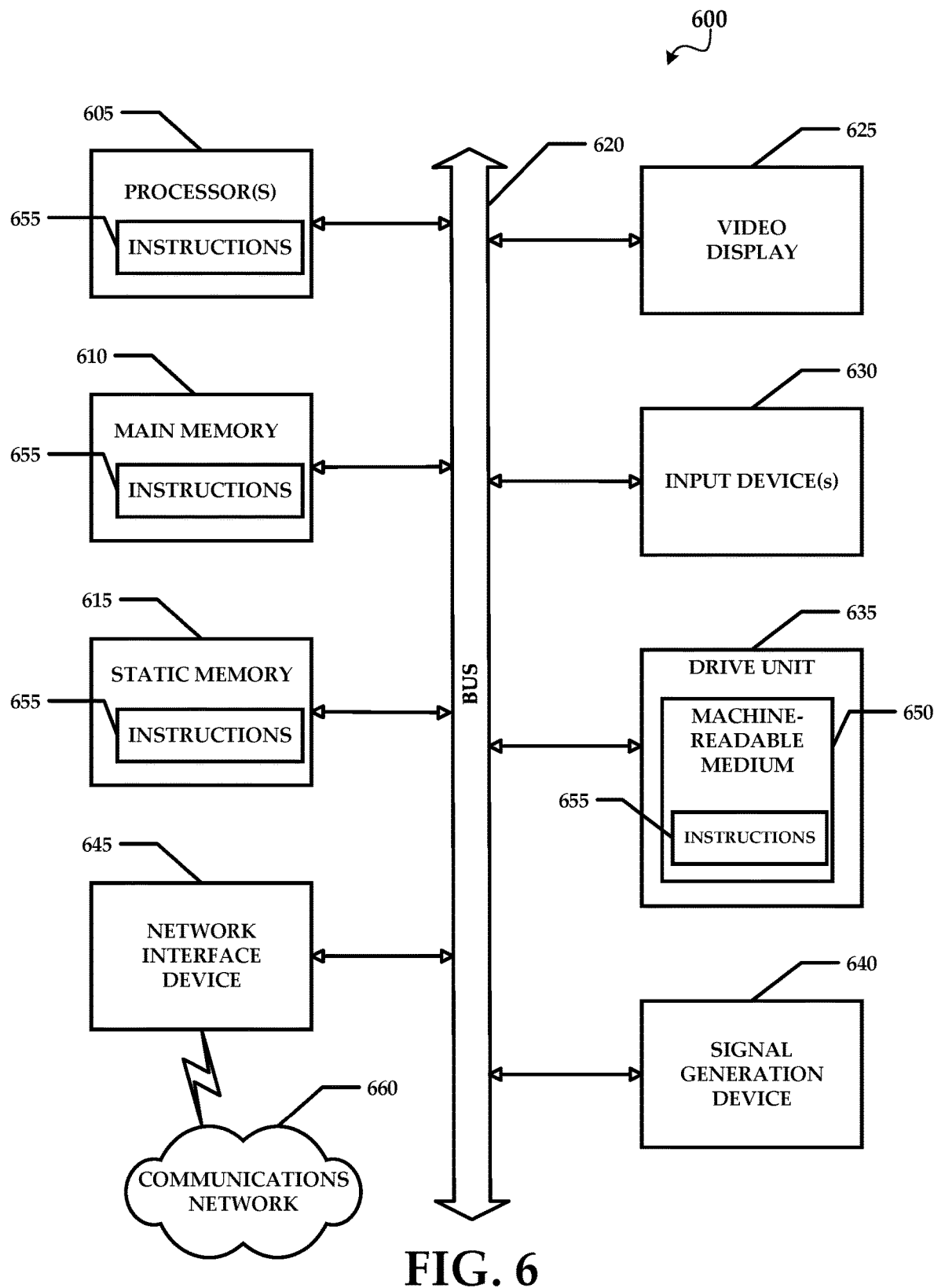
FIG. 6 is a diagrammatic representation of an example machine in the form of a computer system within which a set of instructions for the machine to perform any one or more of the methodologies discussed herein is executed.

FIG. 6 shows a diagrammatic representation of a computing device for a machine in the example electronic form of a computer system 600, within which a set of instructions for causing the machine to perform any one or more of the methodologies discussed herein can be executed. In example embodiments, the machine operates as a standalone device, or can be connected (e.g., networked) to other machines. In a networked deployment, the machine can operate in the capacity of a server, a client machine in a server-client network environment, or as a peer machine in a peer-to-peer (or distributed) network environment. The machine can be a personal computer (PC), tablet PC, game console, gaming device, set-top box (STB), television device, cellular telephone, portable music player (e.g., a portable hard drive audio device), web appliance, or any machine capable of executing a set of instructions (sequential or otherwise) that specify actions to be taken by that machine. Further, while only a single machine is illustrated, the term "machine" shall also be taken to include any collection of machines that separately or jointly execute a set (or multiple sets) of instructions to perform any one or more of the methodologies discussed herein. Computer system 600 can be an instance of at least a console (see e.g. FIG. 1), game server 130, UDS server 125, or data platform 410, for example.

The example computer system 600 includes a processor or multiple processors 605 (e.g., a central processing unit (CPU), a graphics processing unit (GPU), or both), and a main memory 610 and a static memory 615, which communicate with each other via a bus 620. The computer system 600 can further include a video display unit 625 (e.g., a liquid-crystal display (LCD)). The computer system 600 also includes at least one input device 630, such as an alphanumeric input device (e.g., a keyboard), a cursor control device (e.g., a mouse), a microphone, a digital camera, a video camera, and so forth. The computer system 600 also includes a disk drive unit 635, a signal generation device 640 (e.g., a speaker), and a network interface device 645.

The drive unit 635 (also referred to as the disk drive unit 635) includes a machine-readable medium 650 (also referred to as a computer-readable medium 650), which stores one or more sets of instructions and data structures (e.g., instructions 655) embodying or utilized by any one or more of the methodologies or functions described herein. The instructions 655 can also reside, completely or at least partially, within the main memory 610 and/or within the processor(s) 605 during execution thereof by the computer system 600. The main memory 610 and the processor(s) 605 also constitute machine-readable media.

The instructions 655 can be further transmitted or received over a communications network 660 via the network interface device 645 utilizing any one of a number of well-known transfer protocols (e.g., Hyper Text Transfer Protocol (HTTP), CAN, Serial, and Modbus). The communications network 660 includes the Internet, local intranet, Personal Area Network (PAN), Local Area Network (LAN), Wide Area Network (WAN), Metropolitan Area Network (MAN), virtual private network (VPN), storage area network (SAN), frame relay connection, Advanced Intelligent Network (AIN) connection, synchronous optical network (SONET) connection, digital T1, T3, T1 or E3 line, Digital Data Service (DDS) connection, Digital Subscriber Line (DSL) connection, Ethernet connection, Integrated Services Digital Network (ISDN) line, cable modem, Asynchronous Transfer Mode (ATM) connection, or an Fiber Distributed Data Interface (FDDI) or Copper Distributed Data Interface (CDDI) connection. Furthermore, communications network 660 can also include links to any of a variety of wireless networks including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), cellular digital packet data (CDPD), Research in Motion, Limited (RIM) duplex paging network, Bluetooth radio, or an IEEE 802.11-based radio frequency network.

While the machine-readable medium 650 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Thus, the technology for cross-platform spoiler blocking is disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for spoiler blocking, the method comprising:
   ascertaining, by a data platform having a unified data model, data potentially available to a user of an at least one service having a media object, the at least one service including the unified data model, the at least one service able to receive information from other data sources;
   identifying, by the data platform, at least one object revealed by the media object, the at least one object being associated with a gaming application;
   receiving, by the data platform, metadata associated with the at least one object, the metadata indicative of whether the at least one object should be hidden from the user;
   determining, by the data platform, based on the metadata, the at least one object is a potential spoiler; and
   redacting, by the data platform, the at least one object through the at least one service, based on the determining that the at least one object is a potential spoiler.

2. The computer-implemented method of claim 1, further comprising the at least one service including at least one of a video-sharing service, an online forum, or a messaging service.

3. The computer-implemented method of claim 1, further comprising the media object including at least one of an icon, an image, a video, a video segment, a broadcast, or text.

4. The computer-implemented method of claim 1, further comprising:
   receiving, by the data platform a request from the user indicating a preference not to check for spoilers; and
   based on the request, bypassing the identifying of the at least one object revealed by the media object.

5. The computer-implemented method of claim 1, wherein the redacting the at least one object comprises skipping a portion of a video, video segment, or broadcast where the portion is determined to be a potential spoiler.

6. A computer-implemented system for spoiler blocking, the system comprising:
   a data platform, having a unified data model, the data platform configured to:
      ascertain data potentially available to a user of an at least one service having a media object associated with the data platform, the at least one service including the unified data model, the at least one service able to receive information from other data sources;
      identify at least one object associated with the media object, the at least one object being associated with a gaming application;
      receive metadata associated with the at least one object, the metadata indicative of whether the at least one object should be hidden from the user; and
      determine, based on the metadata, the at least one object is a potential spoiler;
   a database associated with the data platform, the database being configured to store the metadata; and
   wherein the data platform is configured to redact the at least one object through the at least one service, based on the determining that the at least one object is a potential spoiler.

7. The computer-implemented system of claim 6, further comprising the at least one service including at least one of a video-sharing service, an online forum, or a messaging service.

8. The computer-implemented system of claim 6, further comprising the media object including at least one of an icon, an image, a video, a video segment, a broadcast, or text.

9. The computer-implemented system of claim 6, further comprising:
   receiving, by the data platform, a request from the user indicating a preference not to check for spoilers; and
   based on the request, bypassing the identifying of the at least one object revealed by the media object.

10. The computer-implemented system of claim 6, wherein the redacting the at least one object comprises skipping a portion of a video, video segment, or broadcast where the portion is determined to be a potential spoiler.

11. A non-transitory computer-readable storage medium having embodied thereon instructions, which when executed by a processor, perform steps of a method, the method comprising:
- ascertaining, by a data platform having a unified data model, data potentially available to a user of an at least one service having a media object, the at least one service including the unified data model, the at least one service able to receive information from other data sources;
- identifying, by the data platform, at least one object revealed by the media object, the at least one object being associated with a gaming application;
- receiving, by the data platform, metadata associated with the at least one object, the metadata indicative of whether the at least one object should be hidden from the user;
- determining, by the data platform, based on the metadata, the at least one object is a potential spoiler; and
- redacting, by the data platform, the media object through the at least one service, based on the determining that the at least one object is a potential spoiler.

12. The non-transitory computer-readable storage medium of claim 11, having instructions for the method further comprising:
- the at least one service including at least one of a video-sharing service, an online forum, or a messaging service.

13. The non-transitory computer-readable storage medium of claim 11, having instructions for the method further comprising:
- the media object including at least one of an icon, an image, a video, a video segment, a broadcast, or text.

14. The non-transitory computer-readable storage medium of claim 11, having instructions for the method further comprising:
- receiving, by the data platform a request from the user indicating a preference not to check for spoilers; and
- based on the request, bypassing the identifying of the at least one object revealed by the media object.

15. The non-transitory computer-readable storage medium of claim 11, having instructions for the method further comprising:
- wherein the redacting the at least one object comprises skipping a portion of a video, video segment, or broadcast where the portion is determined to be a potential spoiler.

* * * * *